United States Patent Office
3,490,876
Patented Jan. 20, 1970

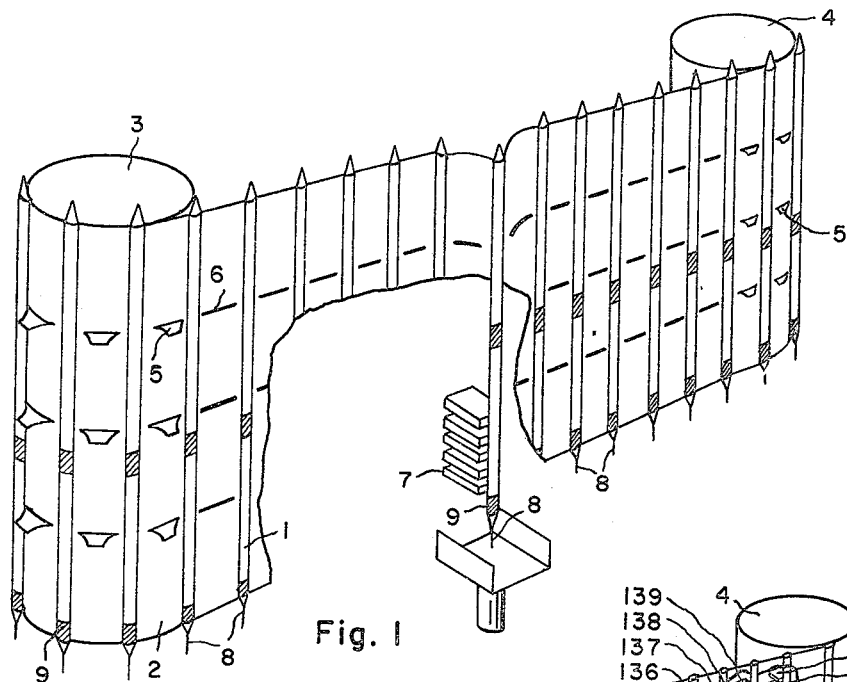
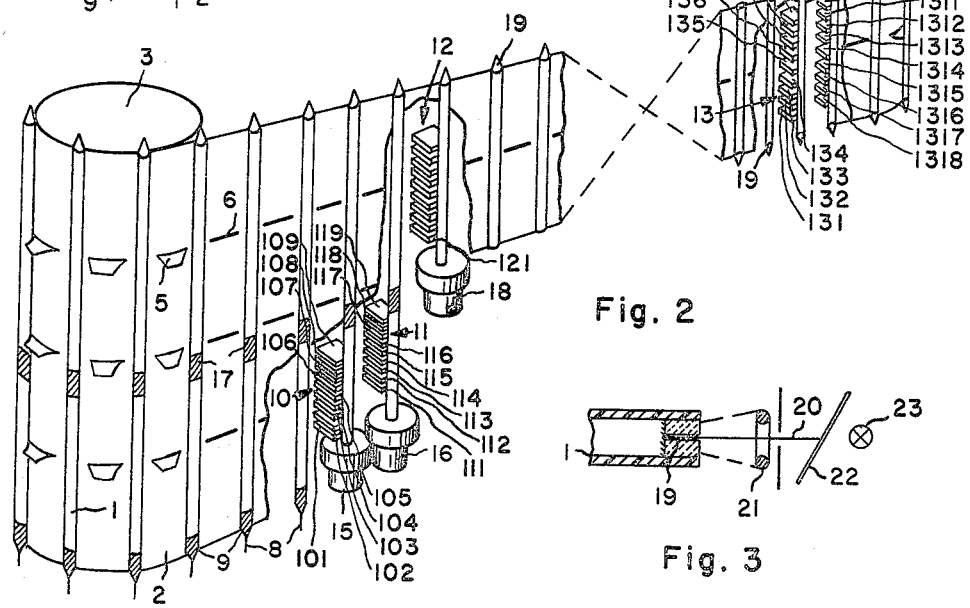
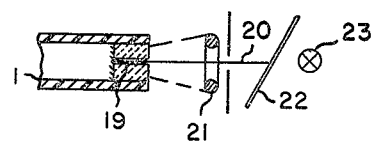
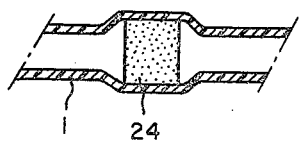

3,490,876
ANALYSING DEVICES FOR FLUID SAMPLES
Michel Auphan, Neuilly-sur-Seine, and Jean Perilhou, Bourg-la-Reine, France, assignors, by mesne assignments, to U.S. Philips Corporation, New York, N.Y., a corporation of Delaware
Filed Mar. 29, 1967, Ser. No. 626,862
Claims priority, application France, Apr. 5, 1966, 56,412
Int. Cl. G01n 33/16
U.S. Cl. 23—253    7 Claims

ABSTRACT OF THE DISCLOSURE

An automatic analysing device in which a plurality of flexible tubes are attached to a moving belt. A plurality of press buttons are positioned adjacent the tubes and by a selective and programmed actuation of the press buttons the tubes can be deformed and thus admit, discharge and/or intermix in the tubes the fluid which is to be analysed.

---

The invention relates to an automatic analysing device for fluid samples, in which the result is obtained by colorimetric measurements of the fluid. Such a device may be employed inter alia for automatically dosing the chemical main constituents of blood (urea, glucose, cholesterol, sodium, potassium, etc.), while minimum quantities are taken. It is important to have a possibility of carrying out such analysis by means of a device with a minimum of human intervention.

An automatic analyser has been described in French patent specification 1,115,431 of Sept. 24, 1954, in which the fluid samples to be analysed are pumped from a flask into tubes and diluted, the successive samples being separated from each other by an air bubble. The diluted samples are passed to a dialiser and are conveyed along a membrane, along which a reagent flows on the other side, said reagent being subdivided into portions equal to the samples. The non-diffusing constituents of the samples are removed, whilst the emerging flow is passed to a measuring instrument, for example, a fluid colorimeter for the analysis to be carried out.

However, such a device involves disadvantages: the identification of the sample is critical and since the separation by air bubbles is not perfect, mutual influence of the samples may be involved. Owing to a potential diffusion between two consecutive analyses it is necessary to use an adequate quantity of fluid in order to have a safety margin at the disposal, which means a restriction for microanalysis. Moreover, in blood analysis for example, it is necessary to use the conventional centrifuging means for separating red blood corpuscles from the plasma.

The present invention has for its object to provide an automatic analysing device for such fluids, which obviates the aforesaid disadvantages.

In a device for automatic colorimetric analysis of consecutive fluid samples, each housed in a flexible tube, said tubes are arranged side by side parallel to each other on a movable belt, the direction of travel of which is at right angles to the direction of length of the tubes, there being provided means to supply in order of succession the substances required for the analysis to the tube by deformation of the tube wall, for example, a quantity of the substance to be tested and one or more auxiliary liquids. Said means are formed by a plurality of rows of press buttons parallel to said tubes, each button being associated with a stationary part arranged parallel to the row, the number of rows of press buttons being at least equal to the number of auxiliary liquids to be introduced into the samples, each tube standing still in order of succession in front of each row between the press buttons and the associated stationary part, while a programmer controls the operation of said press buttons, so that each operative press button urges the opposite tube wall against the stationary part and consequently the liquid flows through the tube.

The invention will now be described more fully with reference to the accompanying drawing.

FIG. 1 shows a device for taking blood for analysing purposes.

FIG. 2 shows an automatic analyser according to the invention and FIG. 3 shows an embodiment of a colorimeter suitable for use in said device.

FIG. 4 shows a filter to be inserted into a tube of said device.

The device to be described hereinafter serves more particularly for dosing one or more constituents of the blood of a number of patients. By way of example, the dosage of glucose in the blood is chosen.

For all chemical or physical reactions the same flexible tube 1 of a synthetic resin, preferably silicone rubber, is used, which is resistant to the chemical agents. Each tube has a very small diameter, so that for each patient and for each analysis a separate tube can be employed.

Prior to starting the analysis the tubes 1 are arranged on a belt 2, for example, of a synthetic resin. After the analysis has been terminated the belt with the tubes can be thrown away.

According to circumstances the tubes may be attached to the belt immediately before the analysis or before the required quantity of blood is taken from the patient. If the same analysis has to be carried out for all patients (for example glucose content), the belt with the tubes may be used first in taking the doses from the various patients. Then the belt is introduced into a device as shown in FIG. 1.

The belt 2 passes along two rollers 3 and 4, the surfaces of which are provided with teeth 5, spaced apart by equal distances and fitting in apertures 6 of the belt. These apertures 6 are located between the tubes 1. The belt 2 moves stepwise and is displaced each time over a distance equal to that between two tubes, while in order of succession each of the tubes 1 comes to a standstill between a row of press buttons 7 and an opposite stationary part, for example, a metal plate. The stationary part is not shown, but it will be obvious that, when a press button 7 moves forward, the tube 1 is squeezed. The lower part of each tube is formed by a needle 8, which penetrates the patient's finger so that the blood automatically rises in the tube by suction. The effect of suction is produced by actuating the press buttons in a predetermined order of succession, the buttons first squeezing the tube against the opposite stationary part and then returning to the initial position.

The lower part of the tube comprises a filter 9, so that immediately after being sucked in the blood is pushed through the filter. In order to avoid any coagulation of the blood a small quantity of anti-coagulant is previously applied to the area of the connection between the needle and the tube. The calculation and the program are such that after filtration about 1/µl. of plasma is available.

In order to make a plurality of different analyses for the same patient a corresponding number of tubes are filled with blood, and in this case the tubes may be attached to a provisional tape. Afterwards, the tubes intended for the same analysis for different patients may be attached to one belt, so that each belt comprises only tubes for the desired analysis.

The analysing device according to FIG. 2 serves for a further investigation and as far as possible the same parts are designated by the same reference numerals. In the analyser the belt 2 with the tubes 1, containing the quantities of blood taken, for example, for measuring the glucose content, is passed along the toothed rollers 3 and 4.

The belt is displaced stepwise along a plurality of consecutive rows of press buttons, arranged opposite stationary parts (not shown). In a device for analysing the glucose in the blood the number of rows of press buttons is four, designated by 10, 11, 12, 13 and 14 in FIG. 2; this number may be higher in a device for carrying out other analyses; for measuring the glucose content only four rows are required.

The distance between two consecutive rows of press buttons is equal to an integral multiple of the distance between two adjacent tubes. In FIG. 2 the first three rows of press buttons 10, 11, 12 are arranged opposite adjacent tubes 1.

The first row 10 serves for diluting the plasma in the tube by an aqueous salt solution or other suitable product. The row comprises a cutter (not shown) and nine press buttons 101 to 109. By way of example, the operation of this row will be described in detail; the operation of all rows will not be explained, since all kinds of operations can be carried out by the appropriate adjustment of the relevant press buttons. The press buttons may be actuated by electromagnets, controlled by a programmer. The tube 1 is sufficiently flexible to be closed when squeezed by a button against the stationary part. In order to dilute a quantity of plasma in a first operation, this quantity is accurately measured: the press button 101 above the filter 9 is actuated so as to squeeze the tube. This position of the press button will be designated as F in the following program. A fluid vacuum is produced by actuating the four press buttons, 106, 107, 108 and 109 by the programme:

F: 101, 106
F: 101, 106, 107
F: 107
F: 101, 107, 108
F: 101, 108
F: 101, 108, 109
F: 101, 109
F: 101, 106, 109
F: 101, 106

The cycle is repeated several times until the fluid is pushed upwards, after which the sequence of displacements by the press butons terminates by

F: 101, 109
F: 109 so that the atmospheric pressure pushes the plasma up to the button 109. Then the press buttons 105, 104, 103, 102 are actuated according to the programme:

F: 105, 109
F: 104, 105, 109
F: 103, 104, 105, 109
F: 102, 103, 104, 105, 109

At the end of this sequence the excess quantity of fluid has been expelled and the lower portion of the tube 1 is cut off along the press button 101 by means of a cutter. The tube 1 then contains a very accurately determined quantity of plasma of $1/\mu l$. Then a cup 15 is placed at the lower end of the tube, which cup is filled with a diluted aqueous salt solution. By actuating the press buttons 102, 103, 104 and 105 according to the following program; the quantity of water equal to the quantity of stored plasma is sucked in.

F: 101, 102, 103, 104, 105, 109
F: 102, 103, 104, 105, 109
F: 103, 104, 105, 109
F: 104, 105, 109
F: 101, 105, 109
F: 101, 109

The plasma and the salt solution may be mixed by actuating the pressbuttons in the following sequence:

F: 101, 103, 105, 107, 109
F: 101, 102, 104, 106, 109
F: 101, 103, 105, 107, 109
F: 101, 104, 106, 108, 109 which terminates after a few repetitions by:

F: 109
F: 105, 109

When the cup of salt solution is withdrawn, the excess quantity of salt solution is removed from the tube by the sequence:

F: 104, 105, 109
F: 103, 104, 105, 109
F: 102, 103, 104, 105, 109
F: 101, 102, 103, 104, 105, 109

The plasma is thus diluted by a factor 2 and by carrying out this process four times a dilution of a factor 16 can be obtained, so that a suitable dosage for colorimetric measurement is obtained.

The belt, which has been standing still for a sufficient time to carry out the various operations on each tube opposite a row of press buttons, restarts its stepwise travel, while the fluid is held in the tubes by capillary effect. For greater security the tubes may be closed by means of a squeezer grasping the lower part of the tubes or by means of elastic constriction.

The second row of press buttons 11 serves for sucking in a first reactant from a cup 16, identical to the cup 15, for expelling or eliminating protein. The first reactant is on the basis of sodium chloride and potassium cyanide. The row 11 operates like the row 10 and comprises like the latter nine press buttons 111 to 119. Three quantities of the reactant have to affect the diluted plasma. This is performed in two consecutive sequences; in the first a mixture of equal portions is formed, whereas in the second a mixing ratio of 1:3 is obtained. Also in this case air is withdrawn in order to prevent the formation of air bubbles which might disturb the measurement. Expulsion is then performed by passing the fluid through the filter 17, which has a sufficient degree of fineness to retain the protein; this filter is arranged directly above the ninth press button. The resultant plasma-reactant mixture is passed through the filter 17 in a suitable sequence. However, this expulsion is not necessary for all dosing operations. A type of filter will be described hereinafter by way of example, to which the invention is, of course, not restricted.

That portion of the tube which has become useless after the expulsion of protein is cut off as described above. The third row of press buttons 12 serves for introducing the second reactant from a cup 18 in the manner described above. This cup contains a mixture of alkali-ferro-cyanide and potassium chloride to be mixed with the available product in a ratio 1:1. Colorimetric measurement requires at least 4 mm.$^3$; the row 1 therefore comprises eighteen buttons, but the sequence of operations is the same.

The accuracy of the analysis depends upon the accuracy of the dosages of blood, plasma and reactant. It is therefore important to use equal quantities for each dilution, even though the operation has to be repeated several times. In this manner all ratios proportional to a higher power of 2 can be obtained and the concentrations of the reactants are chosen accordingly. In order to work up the mixture of equal quantities accurately, steps are taken to use invariably the same volume of the tube 1 for the measurement, which volume is determined by the free volume located opposite press buttons in their normal or unactuated position, and located between press buttons in their actuated position in which the tube is squeezed.

With given dosages it may be useful to control the temperature after the introduction of the reagents for carrying out the colorimetric measurements: the belt 2 with the tubes is passed through a trough of a temperature of 95° F., in which each tube is kept for about 15 minutes. The belt follows a zigzag path in said trough, the two ends of the tube being previously closed by squeezers or other constriction.

Before the belt is inserted into the colorimeter, it is turned or inverted in order to permit the nozzles 19 located at the upper ends, to discharge in a downward direction. The inversion twists the belt and causes it to extend along a helical path.

In the turned state each tube 1 passes in order of succession along a row consisting of 18 press buttons: nine buttons 1310 to 1318 serve for keeping the reaction product and the other nine press buttons 131 to 139 serve for pumping in a small quantity of fluid by which the colorimeter suitable for measuring very small quantities is calibrated. For example, a jet colorimeter as shown in FIG. 3 is employed, in which a fluid jet 20, directly or indirectly exposed to light from a source 21 is projected onto a transparent plate 22, which is arranged in front of a photometer 23. Between every two measurements the plate is washed automatically. The sequence of operations is as follows: the buttons 131 and 1318 are in the position squeezing the tube, for retaining the product. The squeezers are removed and the nozzle 19 is dipped into a water trough (not shown). The water is sucked in by a sequence of operations of the buttons 131 to 139 and then pushed into the colorimeter. When the water jet has attained its maximum stability (the instant thereof is calculated and programmed), the light source 21, for example, a flash-light lamp, is switched on and the quantity of light captured by the photometer is recorded in a magnetic store after conversion into a digital signal. The analysed fluid passes through the tube and is expelled rapidly by the actuation of the press buttons 1310 to 1318 according to a given sequence. The photometer gives a second result, which is recorded as before. The quotient of the two results, obtained in a computer, provides the result of the analysis by comparison obtained from standard samples, occasionally inserted into the chain of analyses.

FIG. 4 shows by way of example a type of filter suitable for use inside the tubes 1, for example, the filters 9 and 17.

This filter is formed by a cylinder 24 of sintered material having a diameter exceeding the outer diameter of the tubes. The filter is disposed at the appropriate area inside the tube on a special machine which causes the tubes to expand by means of high-pressure water, so that the inner diameter exceeds the diameter of the filter, which can thus be arranged at its place without any difficulty.

The invention is not restricted to the examples described above and within the scope of the invention various modifications may be carried out with respect to the elements: tubes, filters, colorimeters and press buttons. The latter may be actuated electromagnetically or pneumatically and in the latter case the device comprises a compressor, while the programmer is formed by a cylinder having suitable grooves and adapted to rotate in a perforated envelope, which parts are linked to the cylinders of the press buttons. The compressed air is supplied through further apertures and the place of the grooves on the cylinder determines the positions of the press buttons.

In the case of blood analysis, to which the invention is not restricted, the device for taking blood may differ from the construction described above: the belt for the tube may be formed by a plurality of belts arranged one above the other, if more than one analysis has to be carried out for each patient. When the blood is taken, the tubes are located one above the other and are connected with the same needle; each belt is passed to the corresponding analysing device.

What is claimed is:

1. A device for automatic analysis of a fluid sample by colorimetric measurement, which samples are each provided in a flexible tube, wherein the tubes are arranged side by side parallel to each other on a movable belt, the direction of movement of which is normal to the longitudinal direction of the tubes, there being provided means for supplying in order of succession the substances required for analysis such as a quantity of the substance to be tested and one or more auxiliary fluids by deformation of the tube walls.

2. A device as claimed in claim 1, wherein a plurality of rows of press buttons are arranged parallel to said tubes, each button being associated with a stationary part parallel to said row, the number of rows of press buttons being at least equal to the number of auxiliary fluids to be introduced into the samples and each tube being brought to a standstill in order of succession in front of each row between the press buttons and the stationary part, said press buttons being actuated by a programmer, each actuated press button pressing the wall of the opposite tube against the stationary part, so that the fluid is pushed on inside the tube.

3. A device as claimed in claim 1, wherein the tubes are arranged at equal distances from each other and the distance between two consecutive rows of press buttons is equal to an integral multiple of the distance between two tubes.

4. A device as claimed in claim 1, wherein each tube accommodates in its direction of length consecutive filters, the number of which is equal to the number of filtrations to be carried out.

5. A device as claimed in claim 1, wherein means are provided for cutting off and conducting away the tube portions worked up after each filtration.

6. A device as claimed in claim 1, wherein the belt passes along two rollers which are moved stepwise by the programmer.

7. A device as claimed in claim 1, wherein a jet colorimeter co-operates with a nozzle at the opposite ends of the tubes and the belt is turned about its axis during its travel so that the upper part of the tube, formed by the nozzle, is turned downwards to arrive at the level of the colorimeter.

References Cited

UNITED STATES PATENTS 3,193,358 7/1965 Baruch _____ 23—230 XR
3,306,229 2/1967 Smythe.

FOREIGN PATENTS 1,513,306 1/1968 France.

MORRIS O. WOLK, Primary Examiner

R. M. REESE, Assistant Examiner

U.S. Cl. X.R.

356—181